(12) United States Patent
Lauzon et al.

(10) Patent No.: US 6,513,649 B1
(45) Date of Patent: Feb. 4, 2003

(54) INDEXING DRIVE SLAT CONVEYOR SYSTEM

(76) Inventors: J. Nelson Lauzon, 14157 Lakeshore Dr., Sterling Heights, MI (US) 48313; Bob Mueller, 1623 Fairview Ave., Royal Oak, MI (US) 48073

( * ) Notice: Subject to any disclaimer, the term of this patent is extended or adjusted under 35 U.S.C. 154(b) by 76 days.

(21) Appl. No.: 09/767,786

(22) Filed: Jan. 23, 2001

Related U.S. Application Data
(60) Provisional application No. 60/179,128, filed on Jan. 31, 2000.

(51) Int. Cl.[7] .............................................. B65G 23/00
(52) U.S. Cl. ................................................. 198/832.1
(58) Field of Search ..................................... 198/832.1

(56) References Cited

U.S. PATENT DOCUMENTS

| | | | |
|---|---|---|---|
| 887,828 A | 5/1908 | Mill et al. | |
| 1,739,497 A | * 12/1929 | Beach | 198/832.1 |
| 1,775,029 A | * 9/1930 | Hippenmeyer | 198/832.1 |
| 1,946,452 A | * 2/1934 | Bridges | 198/832.1 |
| 2,072,840 A | * 3/1937 | Temple | 118/230 |
| 2,145,399 A | 1/1939 | Llewellyn et al. | 107/3 |
| 2,234,081 A | * 3/1941 | Nebuda | 198/526 |
| 2,321,644 A | * 6/1943 | Billstrom | 144/245.3 |
| 2,486,128 A | * 10/1949 | Davis | 198/832.1 |
| 2,792,101 A | * 5/1957 | Leech | 198/550.13 |
| 3,082,859 A | * 3/1963 | Hagner et al. | 198/626.6 |
| 3,241,656 A | * 3/1966 | Thornton | 198/345.2 |
| 3,477,627 A | 11/1969 | Webers | 226/54 |
| 3,557,930 A | 1/1971 | Williamson | 198/19 |
| 3,722,661 A | 3/1973 | Williams | 198/76 |
| 3,834,521 A | 9/1974 | Rauch et al. | 198/203 |
| 3,860,108 A | 1/1975 | Farfaglia | 198/203 |
| 4,054,202 A | 10/1977 | Hautemont | 198/805 |
| 4,189,279 A | * 2/1980 | Anderson | 198/803.14 |
| 4,824,354 A | 4/1989 | Keaton | 425/345 |
| 5,048,673 A | 9/1991 | Lee et al. | 198/832.1 |
| 5,058,723 A | 10/1991 | Hosch | 198/372 |
| 5,170,546 A | 12/1992 | Harris | 29/33 |
| 5,303,809 A | 4/1994 | Zeller | 198/341 |
| 6,164,437 A | * 12/2000 | Brown et al. | 198/832.1 |

* cited by examiner

Primary Examiner—Christopher P. Ellis
Assistant Examiner—Richard Ridley
(74) Attorney, Agent, or Firm—Bliss McGlynn, P.C.

(57) ABSTRACT

An indexing conveyor system including a conveyor mechanism adapted to support and transport objects along the length of the indexing conveyor system and an indexing drive assembly operatively coupled to the conveyor mechanism and adapted to impart indexed movement to the conveyor mechanism. The indexing conveyor system also includes a combined stop and final position assembly operatively coupled to the conveyor mechanism and adapted to stop the indexed movement thereof, to position the conveyor mechanism at discrete, predetermined intervals of distance moved, and to hold the conveyor mechanism in precise predetermined position for a predetermined period of time.

18 Claims, 4 Drawing Sheets

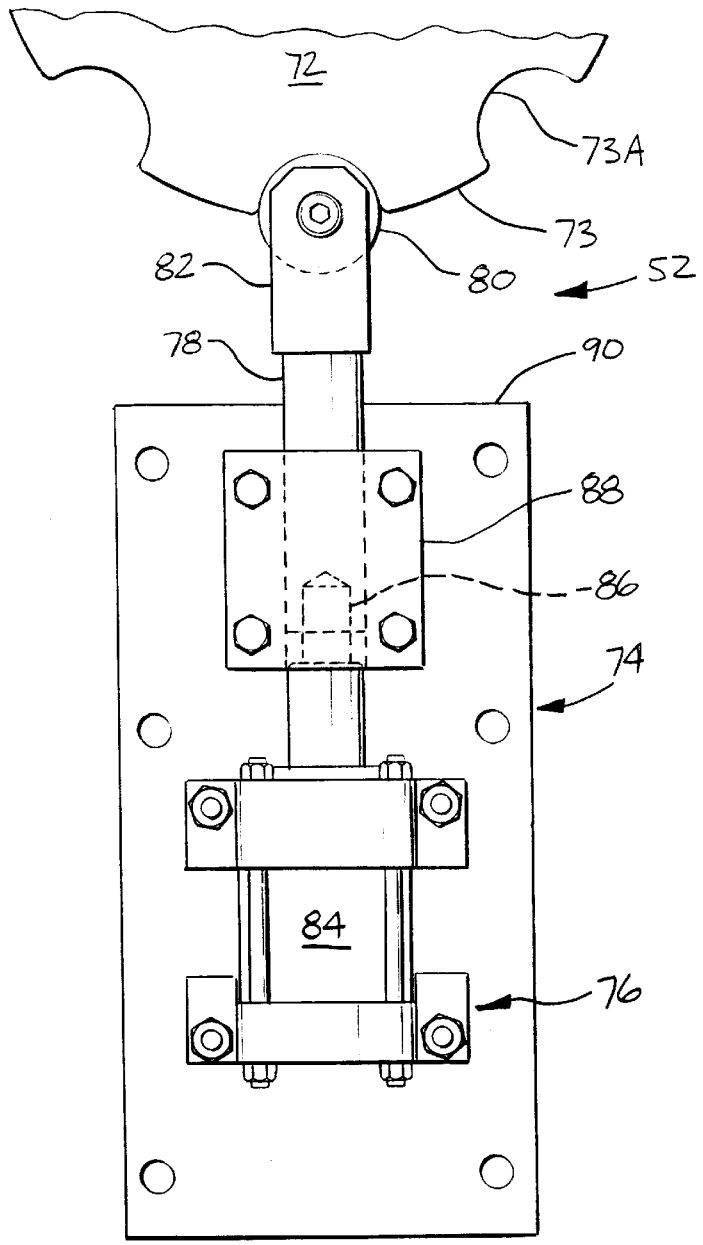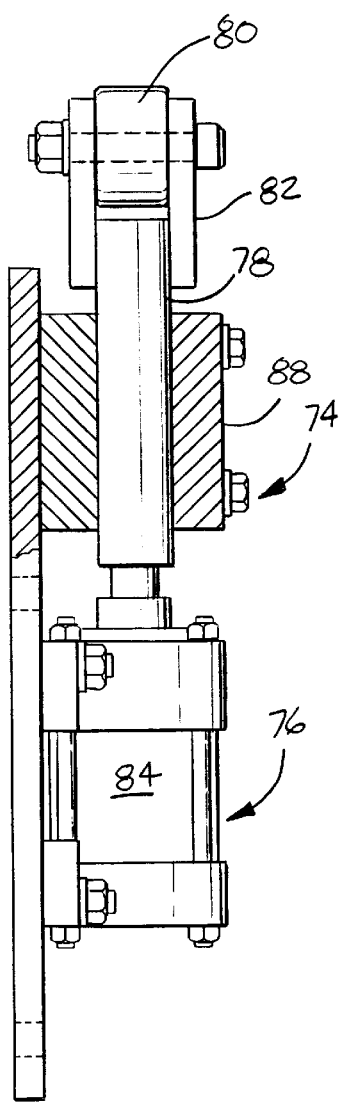
FIG-5
FIG-4

INDEXING DRIVE SLAT CONVEYOR SYSTEM

This application claims the benefit of U.S. Ser. No. 60/179,128 entitled INDEXING DRIVE SLAT CONVEYOR SYSTEM filed Jan. 31, 2000.

BACKGROUND OF THE INVENTION

1. Field of the Invention

The present invention relates, generally, to indexing drive conveyors and, more specifically, to an indexing drive slat conveyor having a combined stop and final position assembly.

2. Description of the Related Art

Conveyors are well known in the material handling art as a means to transport finished goods, components and work in process from one point to another. Thus, conveyors have long been used in many varied manufacturing processes to move work-in-process between work stations. In the past, labor, in the form of a worker, was commonly required to be stationed at one end or the other of the conveyor, for example to offload work-in-process from the conveyor and to precisely position components for the next stage of a sequential manufacturing process such as a stamping, cutting, or welding operations.

However, manufacturing processes continue to employ more and more automation such as robotics, which have eliminated the labor required for many steps in these processes. Still, even with robotics and other automation, there remains a need to precisely position work in process and other material at predetermined timed intervals in many manufacturing environments.

Thus, indexing conveyors have also been employed in the past to move material in predetermined increments from one point to another as a way to better control the flow of work-in-process between two points. While incremental movement of work-in-process has assisted in the control of the flow of material between two points, often such conveyors have suffered from a lack of precision in their movement and the resulting error has a tendency to "stack up" such that control over the position of the material is lost. Furthermore, indexing conveyors known in the related art have suffered from the disadvantage that they are generally much more expensive than other comparable forms of material handling systems.

Accordingly, there remains a need in the art for an indexing drive conveyor system that provides precise, repeatable indexing movement as it conveys material therealong. Further, there remains a need in the art for such an indexing drive conveyor that is cost-effective to manufacture.

SUMMARY OF THE INVENTION

The present invention overcomes the disadvantages in the related art in an indexing conveyor system having a conveyor mechanism that is adapted to support and transport objects along the length of the indexing conveyor system. In one preferred embodiment, the conveyor mechanism includes a drive shaft. An indexing drive assembly is operatively coupled to the drive shaft of the conveyor mechanism and is adapted to impart indexed movement to the conveyor mechanism. In addition, the system also includes a combined stop and final position assembly. The combined stop and final position assembly has a stop sprocket mounted to the drive shaft so that it is rotatable therewith as well as a final position mechanism that is mounted to the conveyor mechanism. The final position mechanism is adapted to selectively engage the stop sprocket to stop the indexed movement of the conveyor. In this way, the combined stop and final position assembly is adapted to position the conveyor mechanism at discrete, predetermined intervals of distance moved and to hold the conveyor mechanism in the precise predetermined position for a predetermined period of time.

The indexing drive conveyor system of the present invention achieves these results in an efficient, cost effective manner that is substantially less expensive than competing indexed conveyors known in the related art.

Other objects, features and advantages of the present invention will be readily appreciated as the same becomes better understood after reading the subsequent description taken in connection with the accompanying drawings.

BRIEF DESCRIPTION OF THE DRAWINGS

FIG. 4 is a side view of the conveyor stop and positioning mechanism of the indexing drive conveyor system of the present invention; and FIG. 5 is a partial cross-sectional end view of the conveyor stop and positioning mechanism of the indexing drive conveyor system of the present invention.

DETAILED DESCRIPTION OF THE PREFERRED EMBODIMENT(S)

Figure 1:
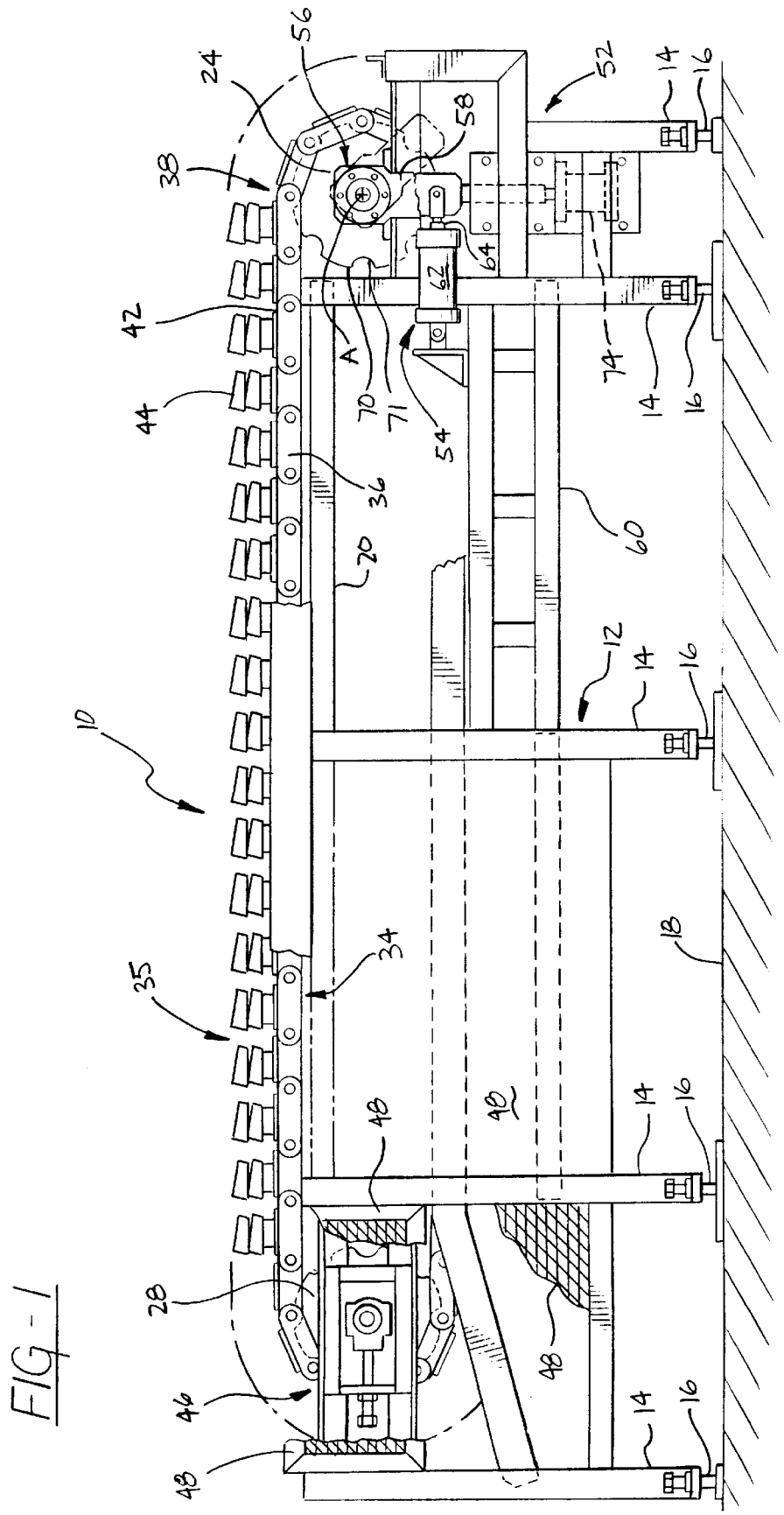
FIG. 1 is a side view of an indexing drive conveyor system of the present invention.
Figure 2:
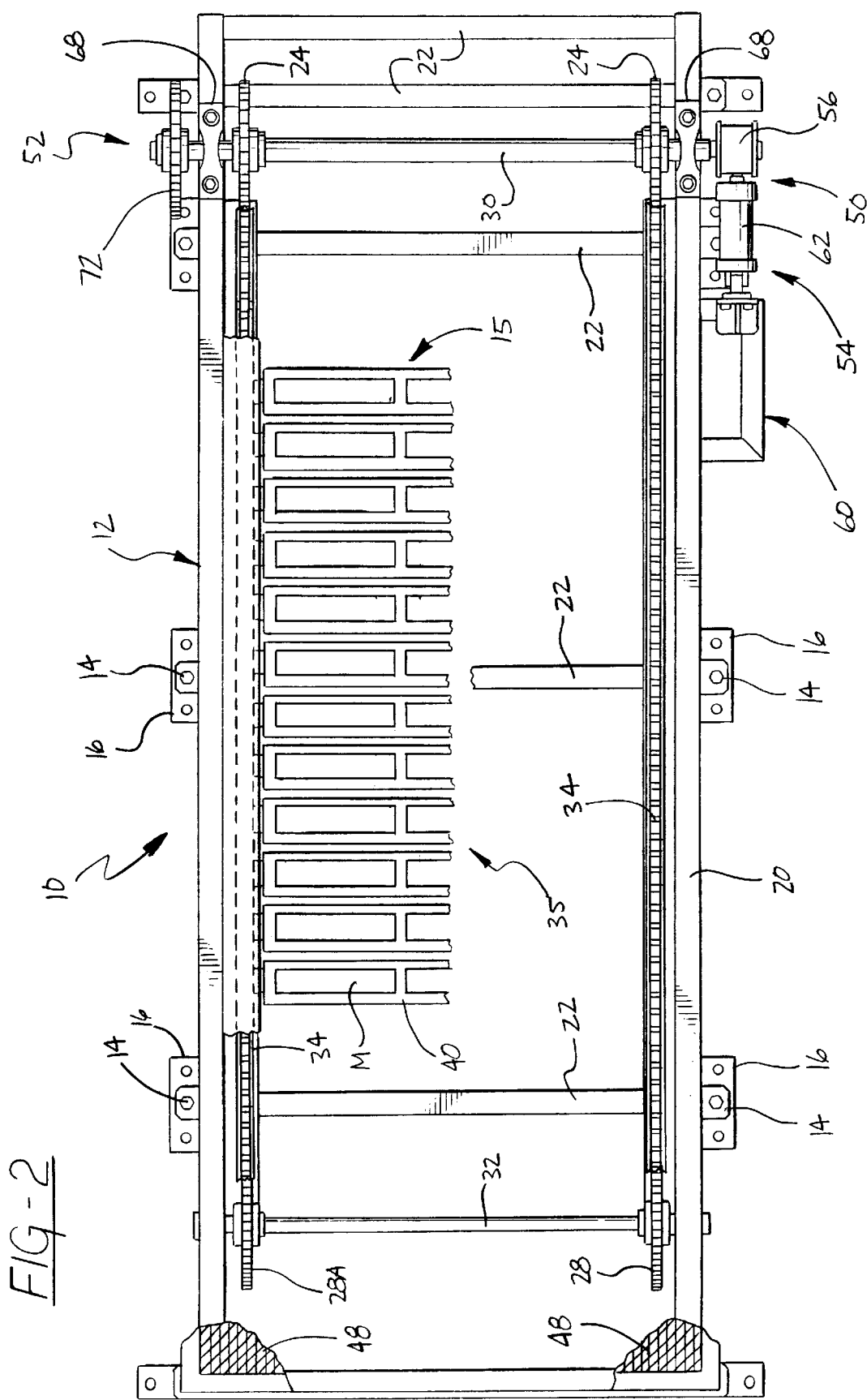
FIG. 2 is a top view of an indexing drive conveyor system of the present invention.
Figure 3:
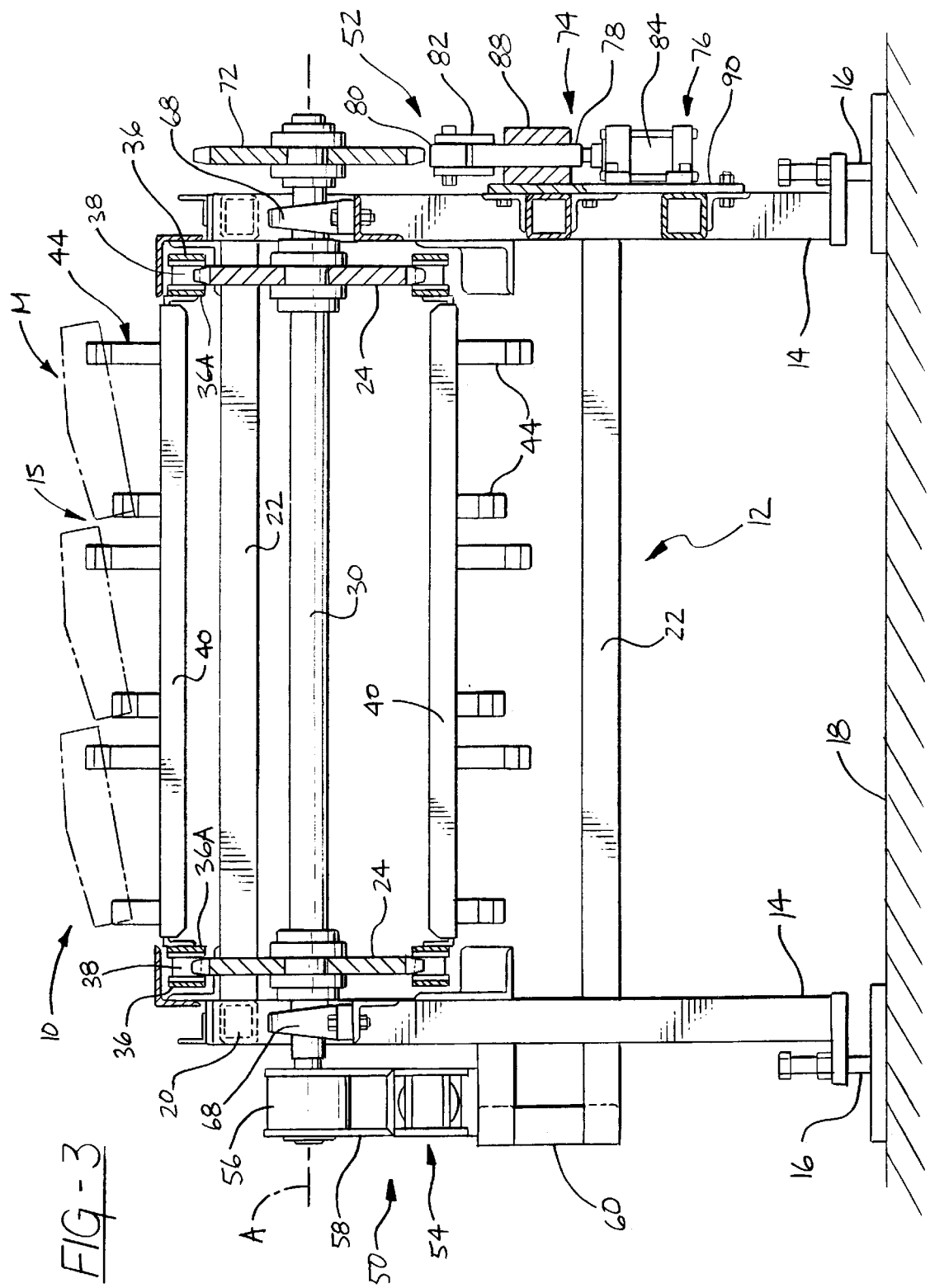
FIG. 3 is a front end view of an indexing drive conveyor system of the present invention.

An indexing drive conveyor system of the present invention is generally indicated at 10 in FIGS. 1 through 3. Referring specifically to FIGS. 1 and 2, the conveyor system 10 includes a frame, generally shown at 12. The frame 12 defines the perimeter of the conveyor system 10 and includes a plurality of upstanding legs 14 disposed spaced from one another along the perimeter of the frame 12. The legs 14 may have adjustable feet 16 which allow for adjustments in the height of the conveyor system 10 and also provide the ability to level the conveyor system 10 relative to any given support surface 18 such as a factory floor. As best shown in the top view of FIG. 2, the frame 12 also includes longitudinally extending side members 20 which extend between and therefore interconnect the spaced legs 14 along the length of the conveyor system 10. Furthermore, the frame includes a plurality of cross bar members 22 which extend from the side members 20 and transverse the longitudinal axis of the conveyor system 10. The cross bar members 22 are spaced from one another along the longitudinal axis of the conveyor system 10. In the preferred embodiment, the cross bar members 22 extend between the legs 14 located on opposite sides of the conveyor system 10. In this way, the frame 12 provides a stabilized support system for the conveyor. While the conveyor system 10 illustrated in these figures is generally depicted as defining an elongated, rectangular perimeter, those having ordinary skill in the art will appreciate from the description that follows that the shape of the conveyor system 10 may be other than rectangular and may encompass a change in direction to provide a non-linear movement of the material from one point to another.

The system 10 includes a conveyor mechanism, generally indicated at 35. The conveyor mechanism 35 includes a pair of roller link chains, generally indicated at 34, which are entrained about corresponding pairs of drive and take-up sprockets 24 and 28, 28A respectively located at opposite ends of the conveyor frame 12. In the preferred embodiment, the drive sprockets 24 are "keyed in pairs" to a drive shaft 30 so that they move in synchronized rotation relative to each other. Only one take-up sprocket 28 is keyed to the take up shaft 32, which causes the take up shaft 32 to rotate with the keyed sprocket 28. Take up sprocket 28A is not keyed to the take up shaft 32 allowing for relative rotation of the take up shaft 32, which compensates for differences in the lengths of the pair of roller link chains 34 and the subsequent difference in the revolutions per minute of sprockets 28 and 28A.

As best shown in FIG. 1, each roller link chain 34 is conventionally constructed and includes a plurality of links 36 and rollers 38. In the preferred embodiment, the roller link chain 34 may be of the CC-5 type having a six-inch pitch centers on rollers 38. As best shown in FIGS. 2 and 3, a plurality of transversely extending slats 40 extend between and are operatively connected to the inner link plates 36A of a corresponding pair of opposed links 36 located on either side of the conveyor system 10 thus forming a linked conveyor belt 15. The slats 40 are spaced in short pre-determined distances 42 relative to each other and are adapted to support a plurality of fixtures 44. The fixtures 44 are typically bolted to the slats 40 and are used to support the material M illustrated in phantom in FIG. 3, which is moved by the conveyor system 10. Thus, the fixtures 44 may take any number of structural forms, the exact features of which are primarily dictated by the material handled by the conveyor as is commonly known in the art. In another non-limiting embodiment, the roller link chain pins (not shown) may fully traverse the distance across the conveyor assembly 10 forming an integral linked conveyor belt (not shown) upon which the slats 40 are disposed.

As best shown at the left of the conveyor as viewed in FIG. 1, the conveyor system 10 may also include a take up mechanism, generally indicated at 46, which adjusts the slack in the conveyor mechanism 35 by adjusting the longitudinal distance between the drive shaft 30 and the take-up shaft 32. In addition, the frame 12 of the conveyor system 10 may include various guards, one example of which is generally indicated at 48, located around the system 10 for the protection of personnel as well as the system itself.

The conveyor system 10 of the present invention also includes an indexing drive assembly, generally indicated at 50 at the right of the conveyor as viewed in FIG. 1. In addition, as seen in FIG. 2, the conveyor system 10 includes a combined stop and final position assembly, generally indicated at 52. The indexing drive assembly 50 advances the conveyor mechanism 35 in discreet, pre-determined intervals of distance and the combined stop and final position assembly 52 positively stops the advancement of the conveyor mechanism 35 and then precisely positions it at the pre-determined location.

More specifically, the indexing drive assembly 50 includes an actuator, generally indicated at 54, an indexing clutch, generally indicated at 56, and an indexing arm, generally indicated at 58, interconnecting the actuator 54 and the clutch 56. In the preferred embodiment, the actuator 54 may be a pneumatic piston/cylinder operatively supported by a cylinder support portion 60 of the frame 12. However, those having ordinary skill in the art will appreciate that any suitable pneumatic, hydraulic, or electric actuator now known or hereinafter invented may be employed for this purpose. In any event, the actuator 54 illustrated in these figures includes a pneumatic cylinder 62 and a piston rod 64 which are moveable in rectilinear fashion between an extended and a retracted position. The piston rod 64 is operatively connected to one end 66 of the indexing arm 58. The arm 58 is rotatable about an axis "A" defined by the clutch 56, as best illustrated in FIG. 1. The clutch 56 is operatively coupled to the drive shaft 30, the shaft being supported in the frame 12 by drive bearings 68 (FIGS. 2 and 3). In the preferred embodiment, the clutch 56 is a Form-sprae one-way, over-running clutch manufactured by Warner Electric, a division of Dana Corporation, which imparts rotational movement to the drive shaft 30 about the axis "A" in the clockwise direction as viewed in FIG. 1 when the piston rod 64 is retracted by the operation of the pneumatic actuator 54. As noted above, the drive sprockets 24 rotate with the drive shaft 30. Each drive sprocket 24 includes a plurality of teeth 70 alternately disposed with tooth depths or dwell portions 71 about its circumference. As the sprockets 24 rotatably engage the roller link chains 34, the rollers 38 are received by the sprocket dwell portions 71 and the sprocket teeth 70 are received in the open areas of the chain between the rollers 38. Rotation of the drive sprocket 24 advances the roller link chain 34 thereby advancing the linked conveyor belt 15.

On the other hand, no rotational movement is imparted to the drive shaft 30 when the piston rod 64 is extended due to the over-running feature of the clutch 56. In this way, discreet, indexed motion is imparted to the conveyor mechanism 35 via the drive sprockets 24 as they rotate with the drive shaft 30 to advance the roller link chain 34 of the conveyor 35.

As best shown in FIGS. 2 and 3, the combined stop and final position assembly 52 is located on the opposite longitudinally extending side of the conveyor system 10 and includes a stop sprocket 72 and a final position mechanism 74. Stop sprocket 72 is precisely keyed to rotate with the drive shaft 30 in such a way that its movement is synchronized with the movement of the drive sprockets 24. Final position mechanism 74 is mounted to the frame 12 just below the stop sprocket 72. The final position mechanism 74 includes an actuator 76, an arm 78, and a roller 80. The roller 80 is operatively connected to the arm 78 via a bracket 82. In turn, the arm 78 is operatively connected to the actuator 76 and adapted for rectilinear, vertical motion as viewed in FIG. 3, which will be described in greater detail below.

With reference to FIGS. 4 through 5, the actuator 76 may include a piston/cylinder assembly including a pneumatic cylinder 84 that acts to extend and retract a piston rod 86. However, those having ordinary skill in the art will appreciate that any suitable pneumatic, hydraulic, or electric actuator now known or hereinafter invented may be employed for this purpose. The piston rod 86 is threadably or otherwise connected to the arm 78 to impart the above-mentioned vertical, rectilinear motion. Further, the arm 78 may be stabilized in its movement via a friction bearing 88. The actuator 76 and friction bearing 88 are mounted to a bracket 90 that, in turn, is operatively secured to the frame 12. The stop sprocket 72 includes a plurality of teeth 73 alternately disposed with dwell portions 73A about its circumference. The dwell portions 73A are adapted to receive roller 80 of the final position mechanism 74. Such that, the outside radial curve of roller 80 and the bottom or inner radial curve of the stop sprocket dwell portions 73A are of equal dimensions.

Rotatable, indexing movement is imparted to the drive shaft 30 via the indexing assembly 50 as described above.

This indexing movement advances the conveyor mechanism 35 a predetermined distance. However, considering this action alone, due to inertia and other system forces, it is possible for the conveyor to over and/or under-shoot its targeted position. An uncontrolled under and over-shooting would cause repeated errors in the positioning of the conveyor mechanism 35 that would be highly undesirable. Accordingly, at the end of an indexing event, the actuator 76, through arm 78 and piston rod 86, moves the roller 80 upwardly as viewed in FIG. 3 into registration with one of the dwell portions 73A on stop sprocket 72.

Positive registration of the roller 80 with a corresponding dwell portion 73A on the stop sprocket 72 provides a two-fold result. First, the roller 80 stops any residual forward, or over-shoot movement that would carry the conveyor mechanism 35 beyond the desired pre-determined stop point. Additionally, to the extent that the corresponding dwell portion 73A on the stop sprocket 72 may be slightly out of phase with the roller 80 due to an under-shoot of the indexed conveyor mechanism 35, the roller 80 will correct the position of the conveyor mechanism 35. Specifically, if the conveyor mechanism 35, and hence the stop sprocket 72, are not precisely positioned at the completion of the advancement stroke of the indexing drive assembly 50, as roller 80 rolls into registration with a dwell portion 73A the stop sprocket 72 is caused to move in correction. In other words, the interaction of roller 80 with a dwell portion 73A will positively stop the movement of the stop sprocket 72 and correct its angular position by moving it either backward, in the case of an over-shoot, or forward, in the case of an under-shoot.

Secondly, the dwell portions 73A are placed about the circumference of the stop sprocket 72 at the exact angular positions that correspond to the desired pre-determined stop positions of the conveyor assembly 35 and the linked conveyor belt 15. Additionally, roller 80 has the same radial dimension as the inner radial or bottom curve of the dwell portion 73A. Such that, as roller 80 completes the correction of over or under-shoot by rolling into a dwell portion 73A, roller 80 comes full registration with the dwell position 73A as it seats itself into the inner radial curve.

Therefore, roller 80 also accurately and precisely positions the stop sprocket 72 at each desired pre-determined angular position defined by the placement of the dwell portions 73A. This translates to the precise of the positioning of the conveyor mechanism 35 through the physical connection of the stop sprocket 72 to the drive shaft 30 and to the drive sprockets 24.

It should be noted, that to provide smooth and efficient operation of the indexing conveyor system 10, the stroke length of the actuator 54 of the indexing drive assembly 50 closely corresponds with the desired indexed advancement length. This keeps any inherent over and under-shoots to a minimum, prior to the activation of the stop and final position assembly 52. In the preferred embodiment, both the indexing drive assembly 50 and the combined stop and final position assembly 52 are controlled by a single controller, not shown but as commonly known in the art.

Finally, after the combined stop and final position assembly 52 has fully actuated, thereby stopping and precisely locating the conveyor mechanism 35, it performs an additional function. As the roller 80 reaches final registration with the corresponding dwell portion 73A, the actuator 76 maintains the extended position of roller 80 which acts to hold the stop sprocket 72 at the precise pre-determined position and therefore prevents any errant movement of the entire conveyor mechanism 35 pending the next indexing event. When the next indexed movement of the conveyer mechanism 35 is to occur, the roller 80 is retracted out of positive registration with the dwell position 73A of the stop sprocket 72 via retraction of the actuator 76 and the conveyer mechanism 35 is advanced in response to actuation of the indexing drive assembly 50 as described above. Thus, the present invention provides both an indexed movement of the conveyor, and a precise positive positioning of the conveyor mechanism 35 that is maintained between the indexed movements.

Since the indexed linear positioning of the conveyor mechanism 35 is a function of the number and placement of the dwell positions 73A upon the stop sprocket 72 corresponding to the advancement stroke length of actuator 54, it can then be appreciated, in another non-limiting embodiment, that that the conveyor mechanism 35 may also be advanced in any number of non-equal length indexed steps. This can be accomplished by the non-equal placement of the dwell positions 73A about the stop sprocket 72 and a corresponding non-equal stroke length of the indexing drive assembly actuator 54.

Finally, the indexing drive conveyor system 10 of the present invention achieves these results in an efficient, cost effective manner, which is substantially less expensive than competing indexed conveyors known in the related art.

The invention has been described in an illustrative manner. It is to be understood that the terminology that has been used herein is intended to be in the nature of words of description rather than of limitation. Many modifications and variations of the invention are possible in light of the above teachings. Therefore, the invention may be practiced other than as specifically described.

We claim:

1. An indexing conveyor system comprising:

a conveyor mechanism adapted to support and transport objects along the length of said indexing conveyor system, said conveyor mechanism including a drive shaft;

an indexing drive assembly operatively coupled to said drive shaft of said conveyor mechanism and adapted to impart indexed movement to said conveyor mechanism; and a combined stop and final position assembly including a stop sprocket mounted to said drive shaft so as to be rotatable therewith and a final position mechanism mounted to said conveyor mechanism, said final position mechanism adapted to selectively engage said stop sprocket to stop said indexed movement thereof, said combined stop and final position assembly adapted to position said conveyor mechanism at discrete, predetermined intervals of distance moved and to hold said conveyor mechanism in said precise predetermined position for a predetermined period of time.

2. An indexing conveyor system as set forth in claim 1 wherein said final position mechanism includes an actuator and an arm operatively coupled to the actuator, said arm terminating in a roller, said actuator providing rectilinear movement of said arm so as to selectively bring said roller into engagement with said stop sprocket.

3. An indexing conveyor system as set forth in claim 2 wherein said stop sprocket defines a plurality of teeth disposed about its circumference with dwell portions disposed between adjacent teeth, said roller adapted to engage said dwell portions upon selective actuation of said actuator to halt any further advancement of said stop sprocket and to precisely position said stop sprocket thereby precisely positioning said conveyor mechanism.

4. An indexing conveyor system as set forth in claim 3 wherein said roller defines a radial diameter and said dwell portions define corresponding concave radial diameters, said radial diameters of said roller and said dwell portions cooperating to insure precision locating of said stop sprocket upon full engagement of said roller with said dwell portions.

5. An indexing conveyor system as setforth in claim 3 wherein said actuator includes a piston-cylinder assembly with said piston operatively coupled to said arm to provide rectilinear movement thereto.

6. An indexing conveyor system as set forth in claim 1 wherein said indexing drive assembly includes an actuator, an indexing clutch operatively connected to said drive shaft and an indexing arm interconnecting said actuator and said clutch, said actuator adapted to provide indexed movement to said drive shaft through said clutch.

7. An indexing conveyor system as set forth in claim 6 wherein said indexing clutch is a one-way overrunning clutch adapted to impart rotational movement to said drive shaft in the direction of movement of said conveyor mechanism upon rectilinear movement of said indexing arm in one direction and to free wheel about said drive shaft upon rectilinear movement of said indexing arm in the opposite direction under the influence of said actuator.

8. An indexing conveyor system as set forth in claim 1 wherein said conveyor mechanism includes at least one drive sprocket mounted to said drive shaft and a chain which is entrained about said drive sprocket and rotatable therewith to advance said conveyor mechanism in indexing fashion.

9. An indexing conveyor system as set forth in claim 8 wherein said conveyor mechanism includes a pair of drive sprockets mounted to said drive shaft in laterally spaced relationship with respect to one another on said conveyor mechanism for synchronized rotation relative to said drive shaft and a pair of chains entrained about said drive sprockets.

10. An indexing conveyor system as set forth in claim wherein said conveyor mechanism includes a driven shaft longitudinally spaced on said conveyor mechanism from said drive shaft and a pair of take-up sprockets mounted to said driven shaft in laterally spaced relationship with respect to one another and aligned with said corresponding pair of drive sprockets, said take-up sprocket adapted for synchronized rotation relative to each other, each one of said pair of chains entrained about a corresponding pair of said drive and take-up sprockets.

11. An indexing conveyor system as set forth in claim 10 wherein each of said pair of chains includes a plurality of links extending between a pair of rollers located at each end of said link, a plurality of transversely extending slats extending between and operatively connected to corresponding links on the pair of chains located on either side of said conveyor system, said slats adapted to support material as it is transported along the length of said conveyor mechanism.

12. An indexing conveyor system comprising:
a conveyor mechanism that includes a drive shaft and a linked conveyor belt;
a pair of drive sprockets rotatably fixed upon said drive shaft with teeth disposed about their circumferences for engaging said linked conveyor belt;
a stop sprocket rotatably fixed to said drive shaft with teeth disposed about its circumference and dwell portions disposed between adjacent teeth;
an indexing drive assembly operatively coupled to said drive shaft and adapted to impart indexed movement to said linked conveyor belt through said drive shaft and drive sprockets; and
a combined stop and final position assembly operatively coupled to said conveyor mechanism and adapted to engage said stop sprocket of said conveyor mechanism and stop said indexed movement thereof, to position said conveyor mechanism at discrete, predetermined intervals of distance moved and to hold said conveyor mechanism in said precise predetermined position for a predetermined period of time.

13. An indexing conveyor system as set forth in claim 12 wherein said final position mechanism includes an actuator and an arm operatively coupled to the actuator, said arm terminating in a roller, said actuator providing rectilinear movement of said arm so as to selectively bring said roller into engagement with said stop sprocket.

14. An indexing conveyor system as set forth in claim 13 wherein said roller is adapted to engage said dwell portions upon selective actuation of said actuator to halt any further advancement of said stop sprocket and to precisely position said stop sprocket thereby precisely positioning said conveyor mechanism.

15. An indexing conveyor system as set forth in claim 14 wherein said roller defines a radial diameter and said dwell portions define corresponding concave radial diameters, said radial diameters of said roller and said dwell portions cooperating to insure precision locating of said stop sprocket upon full engagement of said roller with said dwell portions.

16. An indexing conveyor system as set forth in claim 12 wherein said indexing drive assembly includes an actuator, an indexing clutch operatively connected to said drive shaft and an indexing arm interconnecting said actuator and said clutch, said actuator adapted to provide indexed movement to said drive shaft through said clutch.

17. An indexing conveyor system as set forth in claim 16 wherein said conveyor mechanism further comprises a driven shaft longitudinally spaced from said drive shaft;
a pair of take-up sprockets mounted to said driven shaft in a laterally spaced relationship with respect to one another on said conveyor mechanism and aligned with said corresponding pair of drive sprockets, said take-up sprockets adapted for synchronized rotation relative to each other and adapted to engage opposite end of said linked conveyor belt;
said linked conveyor belt adapted as a continuous belt formed by a plurality of transversely jointed links extending laterally between corresponding said drive sprockets and said take-up sprockets; and
said indexing clutch operative as a one-way overrunning clutch adapted to impart rotational movement to said drive shaft in the direction of movement of said conveyor mechanism upon rectilinear movement of said indexing arm in one direction and to free wheel about said drive shaft upon rectilinear movement of said indexing arm in the opposite direction under the influence of said actuator.

18. An indexing conveyor system comprising:
a conveyor mechanism adapted to support material as it is transported along the length of said indexing conveyor system including a plurality of transversely extending slats disposed upon and operatively connected to corresponding links on a linked conveyor belt;
a pair of drive sprockets rotatably fixed upon a drive shaft with teeth disposed about their circumferences for engaging said linked conveyor belt;
a stop sprocket rotatably fixed to said drive shaft with teeth disposed about its circumference and dwell portions disposed between adjacent teeth;

an indexing drive assembly operatively coupled to said drive shaft and adapted to impart indexed movement to said linked conveyor belt and slats through said drive shaft and drive sprockets; and a combined stop and final position assembly operatively coupled to said conveyor mechanism and adapted to engage said dwell portions of said stop sprocket to stop said indexed movement of said conveyor mechanism and to position said conveyor mechanism at discrete, predetermined intervals of distance moved and to hold said conveyor mechanism in said precise predetermined position for a predetermined period of time.

* * * * *